Figure 1:
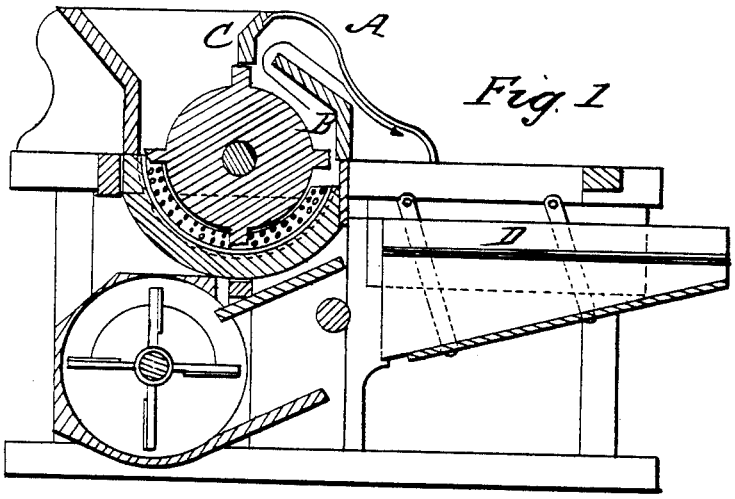
Figure 2:
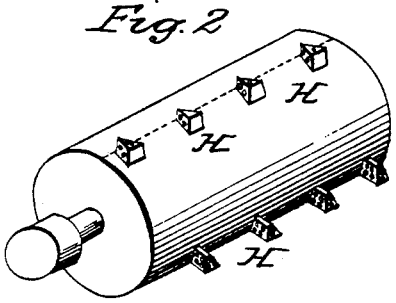
Figure 3:
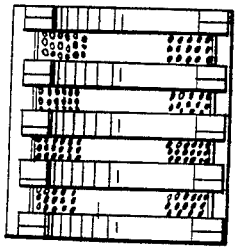

*7843 OR AI 291

SEARCHED

A. OVEROCKER.

Clover Huller.

No. 291.

A. I. Patented July 24, 1860.

WITNESSES

C. M. Alexander

Joseph Carter

INVENTOR

Anthony Overocker

N. PETERS, Photo-Lithographer, Washington, D. C.